United States Patent
Song et al.

(10) Patent No.: US 10,419,575 B2
(45) Date of Patent: Sep. 17, 2019

(54) METHOD AND APPARATUS FOR PROVIDING PERSONALIZED SERVICE

(71) Applicant: Samsung Electronics Co., Ltd., Gyeonggi-do (KR)

(72) Inventors: Sungyoon Song, Seoul (KR); Seungwoo Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 426 days.

(21) Appl. No.: 14/820,904

(22) Filed: Aug. 7, 2015

(65) Prior Publication Data

US 2016/0057247 A1 Feb. 25, 2016

(30) Foreign Application Priority Data

Aug. 25, 2014 (KR) .................. 10-2014-0110709

(51) Int. Cl.
*G06F 15/16* (2006.01)
*H04L 29/08* (2006.01)

(52) U.S. Cl.
CPC .......... *H04L 67/306* (2013.01); *H04L 67/22* (2013.01)

(58) Field of Classification Search
CPC ...... H04L 67/306; H04L 43/045; H04L 67/22
See application file for complete search history.

(56) References Cited

U.S. PATENT DOCUMENTS

| | | | | |
|---|---|---|---|---|
| 6,041,311 | A * | 3/2000 | Chislenko | G06F 17/30699 705/26.7 |
| 2009/0070185 | A1 * | 3/2009 | Farrelly | G06Q 20/123 705/14.4 |
| 2009/0286550 | A1 * | 11/2009 | Weinroth | H04W 24/08 455/456.1 |
| 2013/0218713 | A1 | 8/2013 | Gottfurcht et al. | |
| 2013/0251201 | A1 | 9/2013 | Zhou | |
| 2013/0290369 | A1 * | 10/2013 | Sayers | H04L 67/22 707/769 |
| 2014/0122508 | A1 * | 5/2014 | Eigner | H04L 67/30 707/752 |
| 2015/0235275 | A1 * | 8/2015 | Shah | G06Q 30/0269 705/14.66 |

* cited by examiner

*Primary Examiner* — Moustafa M Meky
*Assistant Examiner* — Kidest Mendaye
(74) *Attorney, Agent, or Firm* — Cha + Reiter, LLC

(57) ABSTRACT

A method and electronic device for providing a personalized service as disclosed. The electronic device may include a communication unit and at least one processor, which implements the method, including generating a user profile based on a use history of the electronic device, receiving a service profile from a service provider and comparing the user profile and the service profile to detect a similarity, and displaying recommended information related to the service profile for which the detected similarity is equal to or greater than a reference value.

13 Claims, 7 Drawing Sheets

METHOD AND APPARATUS FOR PROVIDING PERSONALIZED SERVICE

CLAIM OF PRIORITY

This application claims priority from and the benefit under 35 U.S.C. § 119(a) of Korean Patent Application No. 10-2014-0110709, filed on Aug. 25, 2014, which is hereby incorporated by reference for all purposes as if fully set forth herein.

TECHNICAL FIELD

The present disclosure relates to a method of providing recommended information of high relation with a user by an electronic device.

BACKGROUND

With the remarkable development of information communication technology and a semiconductor technology, the spread and use of electronic devices are rapidly increasing. The electronic device may be used for many different functions, such as capturing a picture, navigation, or financial calculations. Thus, even if a user does not own a, a navigation device, or a credit card, debit card or cash for executing a purchase, the user may use carry out these functions and transactions all using a single electronic device integrating these features. Thus, the electronic device provides a variety of functions, thereby improving convenience of the user.

SUMMARY

However, when an excessively large amount of information is stored in the electronic device and the user loses the electronic device (or the electronic device is hacked), damage or harm to the user may be increased in proportion to the quantity of sensitive information. Further, because the user may easily access various information on the electronic device, it may be easy or efficient to search for the desired information in a large quantity of information.

The electronic device may receive a recommendation for various information from various service providers based on the electronic device's use history. However, in order to receive the recommendation of the information, the electronic device first provides the service provider with the use history. Thus, there is a risk in that the use history may be hacked or leaked to the outside during execution of the information transaction.

An example embodiment of the present disclosure provides a method and an electronic apparatus for providing a personalized service, which avoids unwarranted disclosure of use histories of one or more electronic devices, and is capable of providing a user with recommended information highly related to the use history using distributed computing between the one or more electronic devices.

In one example embodiment of the present disclosure, an electronic device is disclosed, including a communication unit configured to receive a service profile from a service provider, and at least one processor configured to: generate a user profile based on a use history of the electronic device, compare the service profile and the generated user profile to detect a similarity, and displaying recommended information related to the service profile for which the detected similarity is equal to or greater than a reference value.

In another example embodiment of the present disclosure, a method of providing a personalized service by an electronic device is disclosed, including: generating a user profile based on a use history of the electronic device, receiving a service profile from a service provider and comparing the user profile and the service profile to detect a similarity, and displaying recommended information related to the service profile for which the detected similarity is equal to or greater than a reference value.

According to the example embodiments of the present disclosure, it is possible to provide a user with recommended information highly related to a use history of the electronic device without providing the use history to a service provider.

According to the example embodiments of the present disclosure, it is possible to provide user-customized information by combining use histories of one or more electronic devices preset by distributed computing, generating a user profile, and providing a user with recommended information highly related to the user profile from among the recommended information received from a service provider.

BRIEF DESCRIPTION OF THE DRAWINGS

The present disclosure will be more apparent from the following detailed description in conjunction with the accompanying drawings, in which.

DETAILED DESCRIPTION

Figure 1:
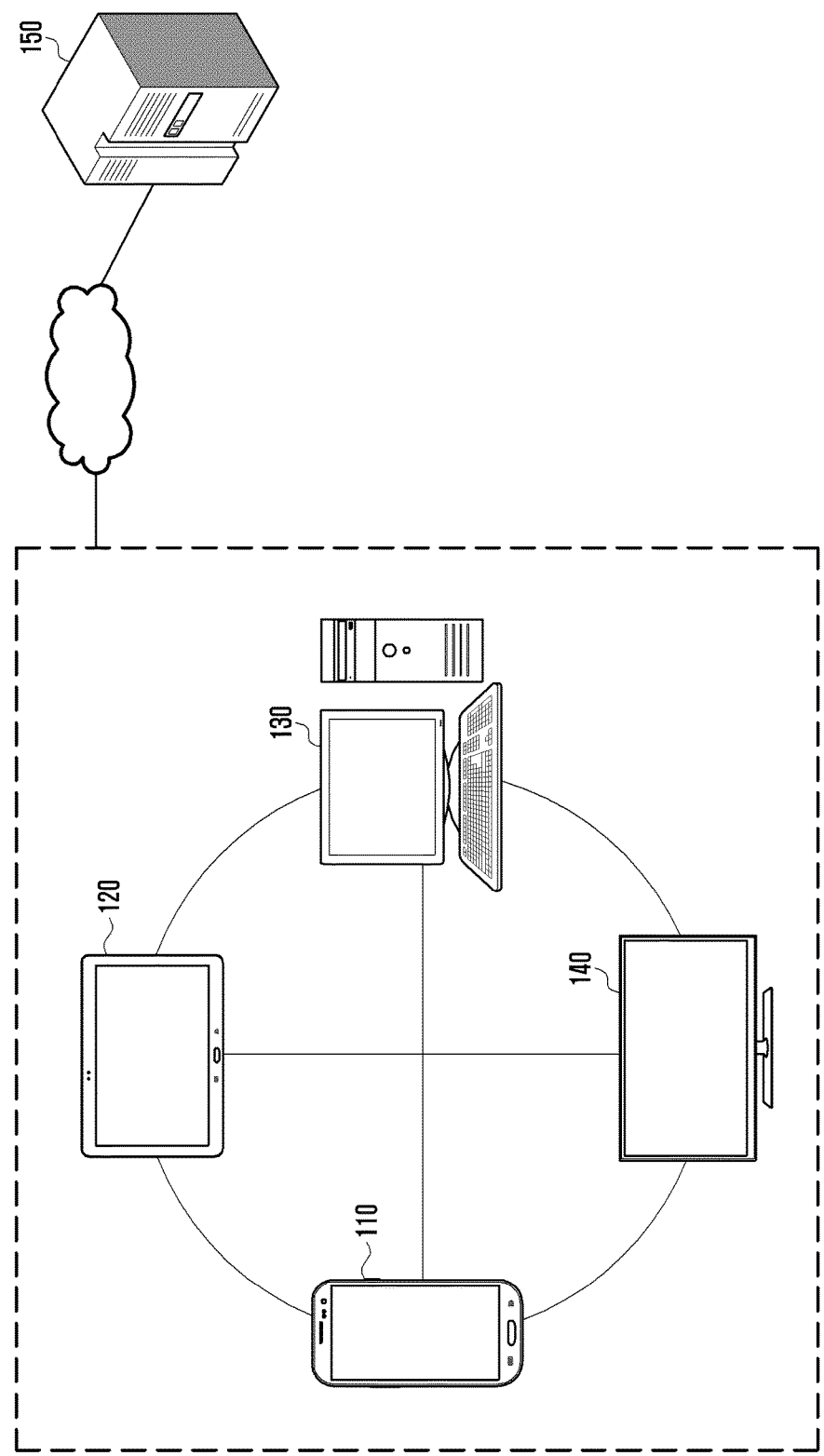
FIG. 1 is a diagram illustrating a network environment including one or more electronic devices and a service provider according to an example embodiment of the present disclosure.

Hereinafter, various example embodiments will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that the descriptions will be provided that may help understanding the operations provided in association with the various embodiments of the present disclosure, and other descriptions will be omitted to avoid making the subject matter of the present disclosure rather unclear.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are example only and not to be considered as a limitation of this disclosure.

A personalized service of the present disclosure aims to provide recommended information most appropriate to a user of each electronic device based on the use history by using distributed computing between one or more electronic devices without providing a service provider with a use history of the one or more electronic devices. To this end, the user may precede an operation of setting the one or more electronic devices as targets, which are to receive the personalized service, in advance. That is, the personalized service may be provided to an electronic device which is set as a target, which is to receive the personalized service.

FIG. 1 is a diagram illustrating a network environment including one or more electronic devices and a service provider according to an example embodiment of the present disclosure.

Referring to FIG. 1, a user may receive a "personalized service" providing recommended information deemed most appropriate for the user from a variety of information received from a service provider 150, using one or more electronic devices 110 to 140. The one or more electronic devices 110 to 140 may include a smart phone 110, a tablet PC 120, a computer 130, and a smart TV 140. In addition, an electronic device of the present disclosure may implement a communication function and a display function, and include a variety of functions implemented traditionally by other electronic devices. For example, the electronic device may include the functionality of MP3 player, a set-top box, a notebook computer, and the like.

The service provider 150 may be a business operator advertising a product or providing content through the Internet. The products include a "tangible" product which a user may touch, or an intangible product, such as applications, data, and financial products (e.g., deposit/savings, fund, and stock), which a user is not able to touch. The content may be one or more the intangible products, such as, for example, music, movies, articles, news, and stories, site membership or product membership. The service provider 150 may provide the smart phone 110, the tablet PC 120, the computer 130, and the smart TV 140 with a service profile and recommended information related to the service profile. The service profile may include a different profile according to a product, the Internet, an application, and data.

In order to receive the personalized service, the user may set at least one of the one or more electronic devices 110 to 140 as a target for receiving the personalized service. The electronic device, set as the target, may then receive the personalized service. For example, in FIG. 1, all of the electronic devices 110 to 140 may be set as targets for receiving the personalized service. The one or more electronic devices 110 to 140 may "transceive" (e.g., transmit and/or receive) data through wireless communication, such as WiFi, Bluetooth, Near Field Communication (NFC), and the like.

Hereinafter, an example embodiment in which the smart phone 110 provides a personalized service will be described. However, the tablet PC 120, the computer 130, and the smart TV 140 are understood as possibly performing the same operation as that of the smart phone 110. The smart phone 110 may accumulate (e.g., store and update) a use history for a user's use of the smart phone 110. The use history may include at least one of a product purchase history, an Internet access history, an application use history, and a data use history, etc., which may be designated for a default or user-configured time period. The smart phone 110 may encrypt the use history and store the encrypted use history. The smart phone 110 may then generate a user profile based on the use history.

In this case, the smart phone 110 may share one or more of a use history of the tablet PC 120, a use history of the computer 130, and a use history of the smart TV 140. The smart phone 110 may receive a use history for each of the tablet PC 120, the computer 130, and the smart TV 140 through the wireless communication, described earlier as WiFi, Bluetooth, and NFC. The smart phone 110 may combine the various use history, such as the use histories of the tablet PC 120, the computer 130, and the smart TV 140, to generate the user profile. This is beneficial because even though the user is same, the use history may be different according to each particular electronic device.

For example, the user may utilize the smart phone 110 mainly to photograph an image, play games, listen to music, and navigate. In contrast, the tablet PC 120 may be used to watch movies, play games, play musical instruments, and navigate. Similarly, the user may work on documents, edit data, play games, and browse the Internet using the computer 130, but watch movies and buy products via the smart TV 140. Accordingly, the smart phone 110 may also reflect use histories accumulated by all the electronic devices (such as, for example, the tablet PC 120, the computer 130, and the smart TV 140) in combination with the use history accumulated by the smart phone 110 to generate a user profile. The user profile may include a product profile (such as, for example, the type of product, a product name, and a product manufacturing company), an Internet profile (such as, for example, the type of site, a site address, and a keyword), an application profile (such as, for example, the type of application and an application name), and a data profile (such as, for example, the type of data, a data name, a data writer, a data cast member, and a data thumbnail).

The smart phone 110 may transmit the generated user profile to the tablet PC 120, the computer 130, and the smart TV 140 through the wireless communication. That is, the smart phone 110, the tablet PC 120, the computer 130, and the smart TV 140 may mutually share the user profile.

According to various example embodiments of the present disclosure, the smart phone 110 may assign a higher weighted value to the self-accumulated use history than the use histories of the tablet PC 120, the computer 130, and the smart TV 140. As described above, the primary functions utilized by the user for each device is different according to the type of the respective electronic device. In the present disclosure, a higher weighted value may be assigned to a specific or particular electronic device (such as, for example, the smart phone 110) to receive the recommended information, so that the specific electronic device may receive more specialized recommended information. The smart phone 110 may combine the use history and the use histories of the tablet PC 120, the computer 130, and the smart TV 140 according to the assigned weighted values to generate the user profile. For example, the smart phone 110 may generate a user profile related to games, image editing, music, navigation, and the like, and the tablet PC 120 mainly generates a user profile related to movie watching, games, musical instrument playing, navigation, and the like.

According to various example embodiments of the present disclosure, the smart phone 110 may share the user profile of another electronic device without sharing the use history of another electronic device. For example, the smart phone 110 may receive the user profiles of the tablet PC 120, the computer 130, and the smart TV 140 instead of the user histories of the tablet PC 120, the computer 130, and the smart TV 140. In this case, the smart phone 110 may combine the self-generated user profile and the user profiles of the tablet PC 120, the computer 130, and the smart TV 140, and generate one user profile (hereinafter "a final user profile"). The smart phone 110 may transmit the final user profile to the tablet PC 120, the computer 130, and the smart TV 140. That is, the smart phone 110, the tablet PC 120, the computer 130, and the smart TV 140 may mutually share the final user profile.

According to various example embodiments of the present disclosure, the smart phone 110 may assign a higher weighted value to the self-generated user profile than the user profiles of the tablet PC 120, the computer 130, and the smart TV 140. The smart phone 110 may combine the user profile and the user profiles of the tablet PC 120, the computer 130, and the smart TV 140 according to the assigned weighted values to generate the final user profile.

The smart phone 110 may compare a service profile received from the service provider 150 with the user profile (or the final user profile) and calculate similarity. A method of calculating similarity will be described with reference to FIG. 2 below. When the calculated similarity is equal to or larger than a reference value, the smart phone 110 may output recommended information about the service profile. For example, when the service profile is related to a "movie", the smart phone 110 may output a "preview" for the movie as the recommended information.

In addition, the tablet PC 120, the computer 130, and the smart TV 140 perform the same operation as that of the smart phone 110. For example, the tablet PC 120 may generate a user profile by combining the self-accumulated used history and the use history accumulated by each of the smart phone 110, the computer 130, and the smart TV 140, and then share the generated user profile with the smart phone 110, the computer 130, and the smart TV 140. The method of generating the user profile is the same as that of the smart phone 110. The tablet PC 120 may compare the service profile with the user profile to calculate similarity, and output recommended information related to a service profile of which similarity is equal to or larger than a reference value. The computer 130 and the smart TV 140 perform the same aforementioned operation as that of the smart phone 110.

Figure 2:
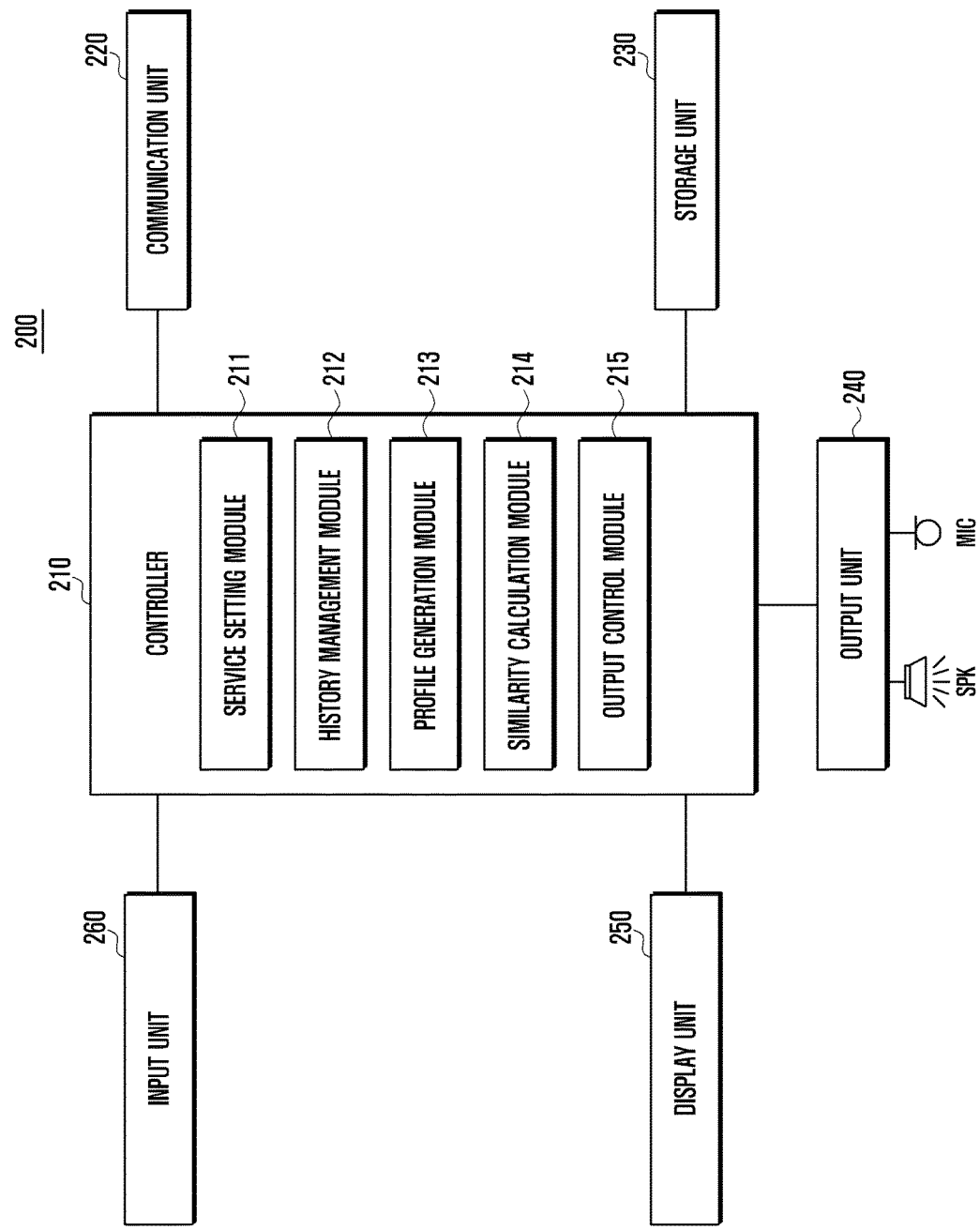
FIG. 2 is a block diagram illustrating a configuration of an electronic device according to an example embodiment of the present disclosure.

FIG. 2 is a block diagram illustrating a configuration of an electronic device according to an example embodiment of the present disclosure Referring to FIG. 2, an electronic device 200 may include a controller 210, a communication unit 220, a storage unit 230, an output unit 240, a display unit 250, and an input unit 260.

The controller 210 may include a service setting module 211, a history management module 212, a profile generation module 213, a similarity calculation module 214, and an output control module 215. The controller 210 serves to control all of the elements included in the electronic device 200. The controller 210 controls a general operation of the electronic device 200 and a signal flow between internal elements of the electronic device 200, performs a function of processing data, and controls power supply from a battery to the elements. The controller 210 may include a Central Processing Unit (CPU) (e.g., one or more processors) and a Graphic Processing Unit (GPU). The CPU is a core control unit of a computer system which performs calculations and comparisons of data, the interpretation and execution of instructions, and the like. In place of the CPU, the GPU is a graphic control unit which performs calculations and comparisons of graphic-related data, and the interpretation and execution of instructions, and the like. Each of the CPU and the GPU may be integrated into one package in which two or more independent cores (for example, quad-core) are implemented by a single integrated circuit. The CPU and the GPU may be a System on Chip (SoC). Further, the CPU and the GPU may be packaged as a multi-layer. Meanwhile, a configuration including the CPU and the GPU may be referred to as an "Application Processor (AP)."

The service setting module 211 may receive a setting that a target to receive a personalized service is the electronic device 200 from a user. The personalized service provides recommended information most appropriate to a user of each electronic device based on the use history by using distributed computing between one or more electronic devices without providing a service provider with a use history of the one or more electronic devices. In order to receive the personalized service, the user may set the electronic device 200 as a target to receive the personalized service. The user may also set another electronic device as a target to receive the personalized service, in addition to the electronic device 200.

The history management module 212 may accumulate a use history including one or more of a product purchase history, an Internet access history, an application use history, and a data use history. The history management module 212 may collect the use history for a time period set in the electronic device 200 as a default or set by the user, encrypt the collected use history, and store the encrypted use history in the storage unit 230. As a method of encrypting, a symmetric key manner, in which a key used for encrypting is the same as a key used for decrypting, an asymmetric key manner using a public key, or other encrypting methods are available. The asymmetric manner is to decrypt an encrypted text generated by encrypting a text with a public key by using a private key, contrary to the symmetric key manner. In addition, the encrypting method is a publicly well-known technique, and hereinafter, a description of a detailed technical operation for the encrypting method will be omitted.

The product purchase history, which is information about a product purchased at least once by using the electronic device 200, may include the type of product, a product name, a product price, a product manufacturing company, a selling company, and the like. The Internet access history, which is information about a site accessed at least once by using the electronic device 200, may include the type of site, a site address, a site name, the number of times of access for each site, an access time for each site, an Internet use time, the number of times of use of the Internet, mainly viewed posts, selected or input keywords, and the like. The application use history, which is information about an application executed at least once by using the electronic device 200, may include the kind of application, an application name, an application use time, the number of times of use of an application, a writer of an application, and the like. The data use history, which is information about data used at least once by using the electronic device 200, may include the type of data, a data name, a data writer, a data cast member, a data thumbnail, a data use time, the number of times of use of the data, and the like. The data may include multimedia data, such as music, movies, videos, picture, electronic book, text, and the like.

The service profile may include a different profile according to a product, the Internet, an application, and data. For example, for a "product, the service profile may include a type of product, a product name, a product manufacturing company, and the like. For example, for the "Internet", the service profile may include a type of site, a site address, a keyword, and the like. For example, for an "application", the service profile may include a type of application, an application name, and the like. For example, for "data", the service profile may include a type of data, a data name, a data writer, a data cast member, a data thumbnail, and the like.

The controller 210 may generate a user profile by controlling the profile generation module 213 in order to provide recommended information most appropriate to the user among recommended information related to the service profile. The profile generation module 213 may generate a user profile based on the use history. The user profile may be a profile for a product, the Internet, an application, and data in which a user is mainly interest. For example, the user profile may include at least one of a product profile, an Internet profile, an application profile, or a data profile.

For example, the product profile may include at least one of the type of product, a product name, a manufacturing company, a selling company, or a sale price. That is, the product profile is similar to the product purchase history. The Internet profile may include at least one of the type of site, a site address, or a keyword. That is, the Internet profile is similar to the Internet access history. For example, the type of site may be a portal site, a search site, and an information site. The site address may be a Uniform Resource Locator (URL) address, for example, www.google.com. The keyword may include World Cup, Ji-Seong PARK, Lionel Messi, and Cristiano Ronaldo. The application profile may include at least one of the type of application, an application name, or an application manufacturer. That is, the application profile is similar to the application use history. The data profile may include at least one of the type of data, a data name, a data writer, a data cast member, or a data thumbnail. That is, the data profile is similar to the data use history.

Hereinafter, it is described that the number of other electronic devices is one for convenience of the description, but the number of other electronic devices may be two or more. That is, the electronic device 200 and another electronic device may mutually share the user profile.

According to various example embodiments of the present disclosure, the profile generation module 213 may combine the user profile with another user profile and finally generate one user profile (also referred to as "a final user profile). The reason is that the usage of the electronic device may be different according to the type of the electronic device, so that even though the user is the same, the use history may be different according to the type of the electronic device.

For example, when the electronic device is a "smart phone", the user may mainly photograph an image, play games, listen to music, and navigate, when the electronic device is a "computer", the user may mainly do document work, edit data, play games, and surf a web page, and when the electronic device is a "smart TV", the user may mainly watch movies and buy a product through home shopping. Further, even though a game is played in the "smart phone" and the "computer", the type of game may be different. For example, since performance or a storage capacity of the smart phone is different from performance or a storage capacity of the computer, the game played on the smart phone may be a game which does not utilize a large data capacity compared to the game played in the computer. Accordingly, the profile generation module 213 may combine the user profile with another user profile and finally generate one user profile. The communication unit 220 may transmit the generated user profile to another electronic device. That is, the electronic device 200 and another electronic device may share the user profile.

According to various example embodiments of the present disclosure, the profile generation module 213 may assign a higher weighted value to the user profile than another user profile. The reason is that more specialized recommended information may be provided to the electronic device 200 by assigning a higher weighted value to the electronic device 200 than another electronic device. The profile generation module 213 may combine the user profile with another user profile according to the assigned weighted values and generate the user profile. For example, when the weighted value of the electronic device 200 is "1", the profile generation module 213 may assign a weighted value of "0.5 to 0.7" to another electronic device to generate a user profile specialized to the electronic device 200. Otherwise, the profile generation module 213 may assign a weighted value of 80% to the electronic device 200 and a weighted value of 20% to another electronic device. The weighted value may be assigned to the electronic device 200 as a default, or by the user.

According to various example embodiments of the present disclosure, the history management module 212 may encrypt another use history and store the encrypted use history in the storage unit 230. The profile generation module 213 may generate the user profile by combining the use history and another use history. As described above, even though the user is the same, the use history may be different according to the type of electronic device. Accordingly, the profile generation module 213 may generate the user profile by combining the use history and another use history.

According to various example embodiments of the present disclosure, the profile generation module 213 may assign a higher weighted value to the use history than another use history. The profile generation module 213 may generate the user profile by combining the use history and another use history according to the assigned weighted values.

The similarity calculation module 214 may compare the service profile with the user profile and calculate similarity. As a method of calculating similarity, various similarity calculation methods, such as cosine, Euclidean, and Jaccard similarity, may be used. Here, a method of calculating similarity by using one method among the aforementioned methods will be described. However, the method of calculating similarity is not limited to the described method.

In order to calculate similarity, the similarity calculation module 214 may assign a unique feature ID to each item included in the service profile and the user profile. The similarity calculation module 214 may calculate a score for each allocated feature ID and similarity by applying the calculated score to the similarity calculation method. For a "movie", the service profile and the user profile may include at least one of a movie genre, a movie name, a director, a cast member, or a movie opening day.

The similarity calculation module 214 may allocate a feature ID to each of the movie genre, the movie name, the director, the cast members, and the movie opening day. For example, the similarity calculation module 214 may allocate a feature ID to each director. In a movie, a feature may be divided into a content feature and an authority feature. The content feature, which is a feature based on contexts, may be, for example, an actor/actress, a director, a theme, a genre, a mood, and a keyword. The authority feature, which is an index indicating a quality of contents, may be, for example, an average rating, a box office, and a rating. As described above, the similarity calculation module 214 may calculate similarity by applying the score calculated for each feature ID to the similarity calculation method. As the feature score calculation method, Term Frequency—Inverse Document Frequency (TF-IDF), an existence/non-existence calculation method, a log likelihood calculation method, which are generally used feature scoring algorithms, may be used. The existence/non-existence calculation method is a method, in which when an item is included in the user profile, but is not included in the service profile, "0" is allocated, but when an item is included in both the user profile and the service profile, "1" is allocated.

The output control module 215 may output recommended information related to the service profile of which the similarity is equal to or larger than a reference value. The reference value may be set by the user, or may be set in the electronic device 200 as a default. The reference value may be equal to or larger than average similarity. When the similarity is 51 and the reference value that is the average similarity is 50, the output control module 215 may output recommended information for the service profile. In order to output the recommended information, the communication unit 220 may receive recommended information related to the service profile, of which the similarity is equal to or larger than the reference value, from the service provider. For example, for a "movie", the communication unit 220 may receive a preview for the movie as the recommended information. The output control module 215 may output the preview as the recommended information. The output control module 215 may control the recommended information to be output on the output unit 240 and the display unit 250. When the communication unit 220 receives the service profile, of which the similarity is smaller than the reference value, the output control module 215 may ignore the service profile, and not request for any information to the service provider, thereby preventing unnecessary information from being received.

For example, the user profile may include thriller, action, and science fiction (Sci-Fi) as "movie genres", Transformers, The Dark Knight, and Pirates of the Caribbean as "movie names", Christopher Nolan, Michael Bay, Steven Spielberg as "directors", and Christian Bale, Johnny Depp, Orlando Bloom, Keira Knightley, Anne Hathaway, and Natalie Portman as "cast members". Further, the service profile may include "action, adventure, and Sci-Fi" as movie genres, "Transformers 4" as a movie name, "Michael Bay" as a director, Mark Wahlberg, Nicola Peltz, Jack Reynor, Stanley Tucci, and Li Bing Bing as cast members, and Jun. 25, 2014 as an opening day. The output control module 215 may determine that the number of same items in the movie genre, the movie name, and the director is calculated as four, which is equal to or larger than a reference value by the existence/non-existence calculation method. The output control module 215 may output a preview for "Transformers 4" as the recommended information.

The communication unit 220 may receive a service profile from a service provider. The communication unit 220 may transmit the user profile to another electronic device set as a target to receiving the personalized service. The communication unit 220 may receive another user profile from another electronic device. The communication unit 220 may further receive additional information about the recommended information from the service provider according to a selection input of the user. For example, when the recommended information is a movie preview, the additional information may be an entire movie. However, in order to receive the entire movie, the user may pay a price for the entire movie to the service provider and then receive the entire movie.

The communication unit 220 may receive another use history from another electronic device, and transmit the use history to another electronic device. The communication unit 220 may perform voice call, video call, or data communication with an external device through a network under the control of the controller 210. The communication unit 220 includes a wireless frequency transmitter for upward converting and amplifying a frequency of a transmitted signal, and a wireless frequency receiver for downward converting and low-noise amplifying a frequency of the received signal. Further, the communication unit 220 includes a mobile communication module (for example, $3^{rd}$ generation mobile communication module, $3.5^{th}$ generation mobile communication module, $4^{th}$ generation mobile communication module or the like), a digital broadcasting module (for example, Digital Multimedia Broadcasting (DMB) module), and a short distance communication module (for example, Wi-Fi module, Bluetooth module, Near Field Communication (NFC) module).

The storage unit 230 may store the encrypted use history. The storage unit 230 may store a program and data utilized for an operation of the electronic device 200, and be divided into a program region and a data region. A program controlling the general operation of the electronic device 200, an Operating System (OS) for booting the electronic device 200, an application program, and the like may be stored in the program region. The data region is a region, in which data generated according to the use of the electronic device 200 is stored, and an image, a document, text, an audio, a video, an application, and the like may be stored therein. The storage unit 230 is a secondary memory unit of the electronic device 200, and may include a disk, a RAM, a ROM, a flash memory, and the like.

The output unit 240 may output an audio (voice) for the recommended information. The output unit 240 may be an audio processor, and output a voice under the control of the controller 210. In general, the audio processor may be combined with a speaker SPK and a microphone MIC to input and output an audio signal (for example, voice data) for a voice recognition, a voice recording, a digital recording, and a call. The audio processor receives an audio signal from the microphone or the communication unit 220, D/A converts the received audio signal to an analog signal, amplifies the converted signal, and outputs the amplified signal to the speaker SPK. The speaker SPK converts the received audio signal into a sound wave, and outputs the converted sound wave. The microphone MIC converts a sound wave transmitted from a human or other sound sources to an audio signal.

The display unit 250 may display an image for the recommended information. The display unit 250 displays an image on the screen under the control of the controller 210. That is, when the controller 210 processes (for example, decodes) data into an image to be displayed on the screen and stores the processed image in a buffer, the display unit 250 converts the image stored in the buffer into an analog signal and displays the converted analog signal on the screen. The display unit 250 may be formed of a Liquid Crystal Display (LCD), an Organic Light Emitted Diode (OLED), an Active Matrix Organic Light Emitted Diode (AMOLED), or a flexible display. The display unit 250 of the present disclosure may be formed of a touch screen which may receive an input and display an image.

The input unit 260 may receive a selection input from the user while providing the recommended information. The input unit 260 may include a plurality of keys for receiving numeric or character information and setting various functions. The keys may include a menu opening key, a screen on/off key, a power on/off key, a volume control key, and the like. The input unit 260 may generate a key event related to user's setting and a function control of the electronic device 200 and transmits the generated key event to the controller 210. The key event may include a power source on/off event, a volume control event, a screen on/off event, a shutter event, and the like. The controller 210 controls the configurations in response to the key event. Meanwhile, keys of the input unit 260 may be referred to as hard keys, and virtual keys displayed on the display unit 250 may be referred to as soft keys.

According to the example embodiment of the present disclosure, a use history of the electronic device may not be provided to the service provider, and recommended information related to the use history may be provided to the user.

Figure 3:
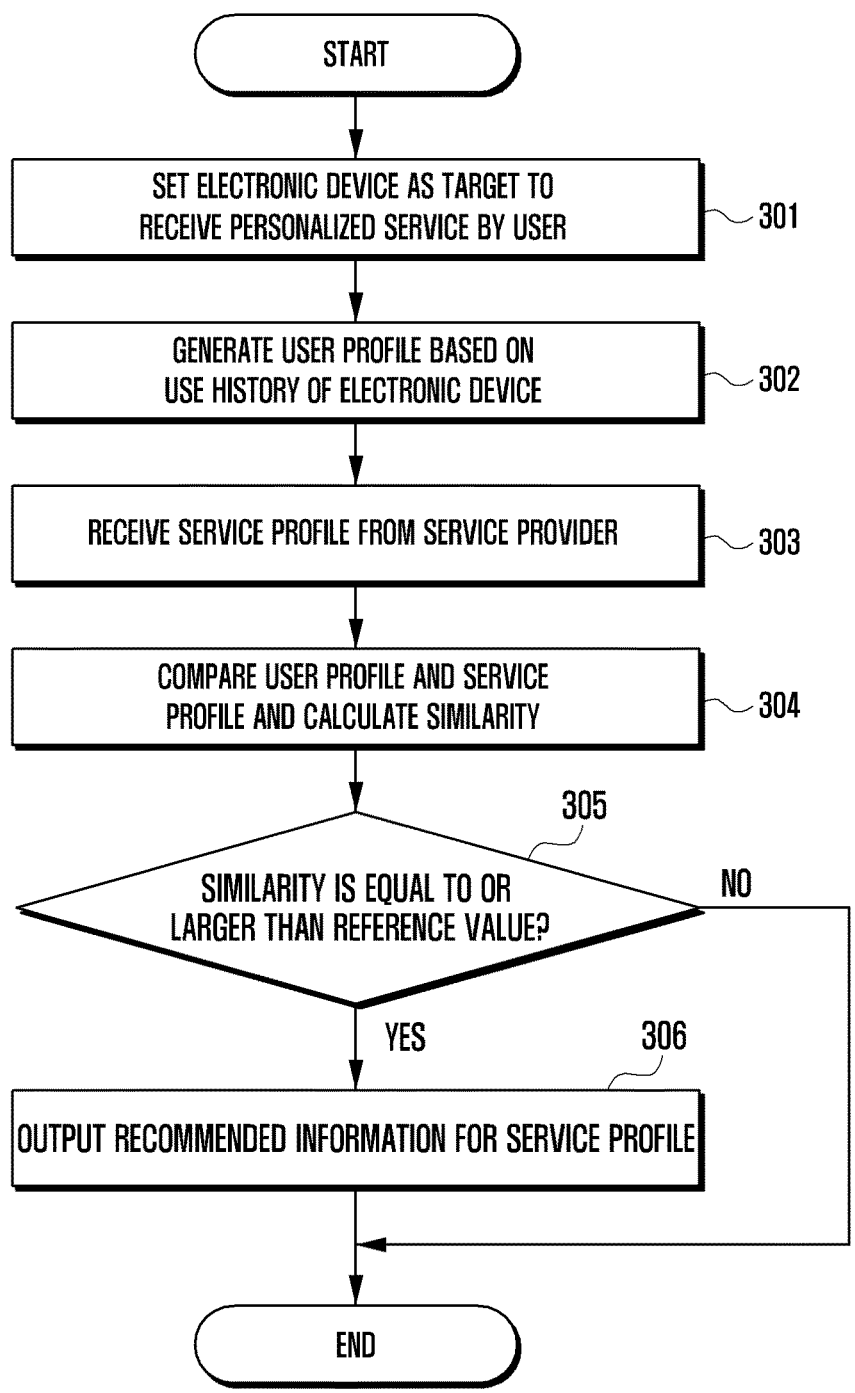
FIG. 3 is a flowchart illustrating a personalized service providing method according to an example embodiment of the present disclosure.

FIG. 3 is a flowchart illustrating a method of providing personalized service according to an example embodiment of the present disclosure. The method of providing personalized service of the present disclosure may be performed by the electronic device of FIG. 2. Hereinafter, the method of providing the personalized service performed by the electronic device will be described.

Referring to FIG. 3, in operation 301, the electronic device may set a target electronic device for receiving a personalized service. This may be set or configured by a user. For example, the electronic device may be set as the target to receive the personalized service in order to provide the personalized service to the user via the electronic device.

In operation 302, the electronic device may generate a user profile based on use history. The use history may include, for example, at least one of a product purchase history, an Internet access history, an application use history, or a data use history. The profile generating module 213 may collect the use history for a time period set as a default or set by the user, encrypt the collected use history, and store the encrypted use history in the storage unit.

The product purchase history, which is information about a product purchased at least once via use of the electronic device 200, may include a product type, name, price, manufacturing company, a retailer, and the like. For example, a type of product related to "women's clothes" may be "women's clothes," a "blouse," a "skirt," and a "one-piece dress." The Internet access history, which is information about a site accessed at least once via the electronic device 200, may include the type of site, a site address, a site name, the number of times each site is accessed, an access time for each site, an Internet use time, the number of times of use of the Internet, such as a number of viewed posts, selected or input keywords, or the like. For example, the type of site may be a portal, a search site, a financial site, an electronic commerce site (such as, for example, Internet retail), a download site, and an information site (such as, for example, online periodicals and news). The keyword, which is a search word, may be input by a user to execute searching.

The application use history, which is information about an application executed at least once by using the electronic device 200, may include the type of application, an application name, an application use time, the number of times of use of an application, a writer of an application, and the like. The type of application may be a call, a text message, a messenger, Internet search, game, a social network, and the like. The data use history, which is information about data used at least once by using the electronic device 200, may include the type of data, a data name, a data writer, a data cast member, a data thumbnail, a data use time, the number of times of use of the data, and the like. The data may include multimedia data, such as music, a movie, a video, a picture, an e-book, text, and the like. The type of data may be music, a picture, a movie, a TV program, an article, news, a story, and the like. For a "movie," a movie genre may be included in the type of data. The movie genre may be, for example, noir, martial arts, romance, comedy, thriller, Sci-Fi, and the like. An author may indicated a person who created the data, and when the data is "music", the author may be a composer and/or a lyric writer, and when the data is a "movie", the author may be a director and/or a producer. A cast member is a person who participated or contributed to a dramatic presentation represented by the data, and when the data is "music", the cast member may be a singer, and when the data is a "movie", the cast member may be an actor/actress. The thumbnail may be other additional information, which is not included in the type of data, the data name, the writer, and the cast member categories.

The user profile may include at least one of a product profile, an Internet profile, an application profile, or a data profile. For example, the product profile may include at least one of the type of product, a product name, a manufacturing company, a selling company, or a selling price. The type of product may be a digital electronic device, a camera, a Digital Single Lens Reflex, or a mirrorless camera. The manufacturing company may include, for example, well-known corporations such as Canon and Sony. The Internet profile may include at least one of the type of site, a site address, or a keyword. The type of site may be a search site, a financial site, and an electronic commerce site. The site address may include www.naver.com and www.gmarket-.co.kr. The keyword may be camera and fund.

The application profile may include at least one of the type of application, an application name, or an application manufacturer. The type of application may include a call application, a messenger application, and a game application. The application name may include well-known application such as Twitter, My People, and Net Marble. The data profile may include at least one of the type of data, a data name, a data writer, a data cast member, or a data thumbnail. The type of data may include a picture, a movie, and an article. When the type of data is a "movie", the data profile may include thriller, action, and Sci-Fi as "movie genres," Transformers, The Dark Knight, and Pirates Of The Caribbean as "movie names," Christopher Nolan, Michael Bay, Steven Spielberg as "directors," and Christian Bale, Johnny Depp, Orlando Bloom, Keira Knightley, Anne Hathaway, and Natalie Portman as "cast members."

The electronic device may receive another use history from another electronic device set as a target to receive the personalized service, combine the use history and another use history, and generate the user profile. In this case, the electronic device may assign a higher weighted value to the use history than a weighted value of another use history, combine the use history and another use history according to the assigned weighted value, and generate the user profile. The electronic device may transmit the generated user profile to another electronic device.

Otherwise, the electronic device may receive another user profile from another electronic device, combine the user profile and another user profile, and generate a final user profile. The electronic device may assign a higher weighted value to the user profile than another user profile, combine the user profile and another user profile according to the assigned weighted value, and generate the final user profile. The electronic device may transmit the generated user profile to another electronic device.

In operation 303, the electronic device may receive a service profile from a service provider. The service provider may be a business operator advertising a product or providing contents through the Internet. The product may have a concept including a tangible product which a user may touch, or an intangible product, such as applications, data, and financial products, which a user may not touch. The contents may be one of the intangible products, for example, music, movie, articles, site membership, or product membership. The service profile may include different profiles according to a product, the Internet, an application, and data.

According to the example embodiment, the service profile may be received before the generation of the user profile. That is, the electronic device may receive the service profile, and then generate the user profile. In this case, the user profile may generate the type corresponding to the service profile. For example, when the service profile is related to a "product," the electronic device may generate a user profile related to the product.

In operation 304, the electronic device may compare the service profile with the user profile and calculate a similarity. For example, the electronic device may assign a feature ID to a synopsis of the movie, and calculate a score for the synopsis by a TF-IDF method. A synopsis of movie 1 may be "YI, Sun-Shin fights with Japanese raiders with Panok-seon in Myeongnyang", a synopsis of movie 2 may be "Jack Sparrow fights with the British army", and a synopsis of movie 3 may be "KIM, Myeong-Min falls in love." In this case, the electronic device may extract "YI, Sun-Shin," "Myeongnyang," "Japanese raiders," and "fight" as keywords for the feature ID (for example, "01") of movie 1. The electronic device may extract "Jack Sparrow," "the British army," and "fight" as keywords for the feature ID (for example, "02") of movie 2, and "KIM, Myeong-Min" and "love" as keywords for the feature ID (for example, "03") of movie 3. Accordingly, for movie 1, a TF of "YI, Sun-Shin" is 1 (a word "YI, Sun-Shin" appears one time in movie 1), and a DF of "YI, Sun-Shin" is 1 (a word "YI, Sun-Shin" appears one time in all movies), so that TF/IDF may be calculated as 1. By contrast, a TF of "fight" is 1, and a DF of "fight" is 2, so that TF-IDF may be calculated as 0.5. In this case, the electronic device may interpret that "YI, Sun-Shin" is a more important word than "fight". Accordingly, the electronic device may calculate a score by using the synopsis of the movie, and calculate similarity by applying the score to the similarity calculation method.

The electronic device may allocate a feature ID to a cast member (such as an actor/actress), and calculate a score for the actor/actress by the TF-IDF method. For example, when cast members shown in movie 1 are "CHOI, Min-Sik" (feature ID: "10"), "KIM, Myeong-Min" (feature ID: "11"), and "YU, Seong-ho" (feature ID: 12), a score for a main actor/actress of movie 1 may be calculated as ( ). When a main actor/actress is "CHOI, Min-sik", a score may be calculated as 0.577. In this case, the electronic device may calculate the score by applying the weighted value assigned to the feature ID. For example, when a weighted value of a synopsis is 0.3, a weighted value of an actor/actress is 0.8, and a weighted value of a genre is 0.6, the electronic device may apply a higher weighted value of the feature ID of the actor/actress than the feature ID of the synopsis.

Accordingly, the electronic device may calculate a score for each feature ID, and then vectorize the calculated score, and calculate similarity by using a cosine-based similarity calculation method. For example, the electronic device may vectorize the score (e.g., feature ID:score, feature ID:score). The electronic device may sequentially vectorize the synopsis, the genre, and the actor/actress (1:0.4, 2:0, 3:0.5) for movie 1, and calculate similarity by using the cosine-based similarity calculation method.

In operation 305, when the similarity is smaller than a reference value, the electronic device may terminate the process, and when the similarity is equal to or larger than a reference value, the electronic device may perform operation 306. That is, when the similarity is smaller than a reference value, the electronic device may determine that recommended information related to the service profile is of little relation with the user, and may not provide the recommended information.

In operation 306, the electronic device may output recommended information related to the service profile of which the similarity is equal to or larger than the reference value. As three items among the four items correspond, the electronic device may output the recommended information for the service profile. The electronic device may request recommended information for the service profile from the service provider, and receive the recommended information from the service provider. For example, the electronic device may display a DSLR camera, "EOS 70D," "Canon," a camera image, and 1,075,570 won (e.g., a selling price) as the received recommended information.

FIGS. 4 to 7 are flowcharts illustrating a method of providing personalized service between a first electronic device and a second electronic device according to an example embodiment of the present disclosure. In FIGS. 4 to 7, it is described that the first electronic device and the second electronic device are set as targets for receiving the personalized service from a user. For example, the first electronic device may be a smart phone, and the second electronic device may be a notebook computer.

Figure 4:
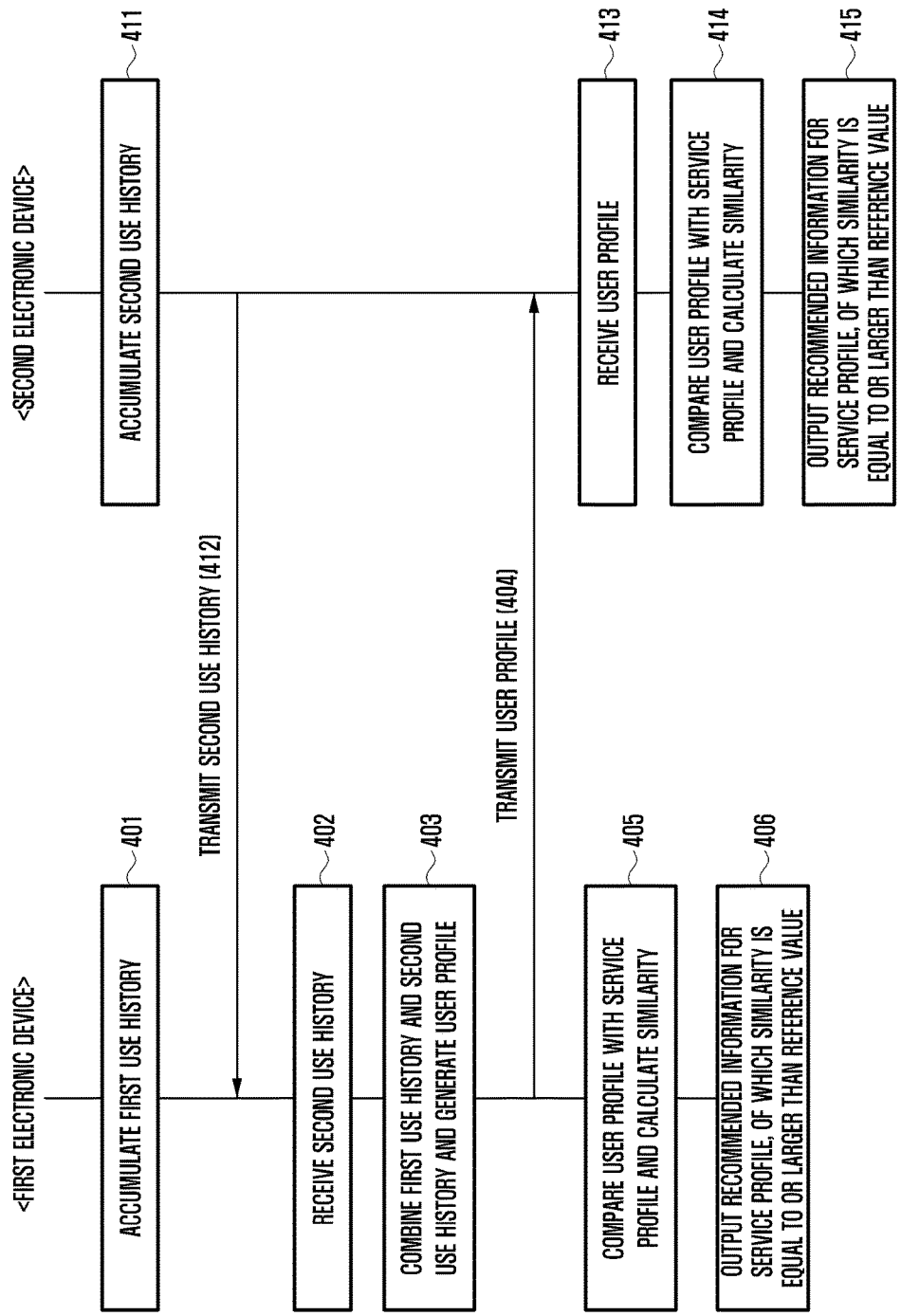
FIG. 4, FIG. 5, FIG. 6 and FIG. 7 are flowcharts illustrating a method of providing personalized service between a first electronic device and a second electronic device according to an example embodiment of the present disclosure.

FIG. 4 is a flowchart illustrating an example embodiment in which a first electronic device generates a user profile by using a second use history received from a second electronic device, and shares the generated user profile with the second electronic device.

Referring to FIG. 4, in operation 401, the first electronic device may accumulate a first use history. The first use history may include at least one of a product purchase history, an Internet access history, an application use history, or a data use history for the first electronic device.

In operation 411, the second electronic device may accumulate the second use history. The second use history may include at least one of a product purchase history, an Internet access history, an application use history, or a data use history for the second electronic device.

The first use history may be the same as or different from the second use history. The first use history and the second use history are sufficient similar to the use history described with reference to FIGS. 1 and 2, such that a detailed description of these use histories will be omitted here for the sake of brevity.

In operation 412, the second electronic device may transmit the second use history to the first electronic device. When the second electronic device periodically receives a request from the first electronic device, or receives a service profile from a service provider, the second electronic device may transmit the second use history to the first electronic device.

In operation 402, the first electronic device may receive the second use history.

In operation 403, the first electronic device may combine the first use history and the second use history to generate a user profile. In this case, the first electronic device may generate the user profile by assigning the same weighted value to the first use history and the second use history. The user profile may include at least one of a product profile, an Internet profile, an application profile, or a data profile, etc.

When the first electronic device periodically receives the second use history from the second electronic device or the service profile from the service provider, the first electronic device may generate the user profile. As the example embodiment, the first electronic device may generate the user profile having the type corresponding to the service profile. For example, when the service profile is related to "the Internet", the electronic device may generate a user profile for the Internet.

In operation 404, the first electronic device may transmit the generated user profile to the second electronic device. In operation 405, the first electronic device may compare the user profile and the service profile and calculate a similarity between the two. In operation 406, the first electronic device may output recommended information related to the service profile for which the similarity is equal to or larger than a reference value.

In operation 413, the second electronic device may receive the user profile from the first electronic device. In operation 414, the second electronic device may compare the received user profile and the service profile and calculate a similarity between the two. In operation 415, the second electronic device may output recommended information related to the service profile of which the similarity is equal to or larger than the reference value.

For reference, when the service profile received from the first electronic device is the same as the service profile received from the second electronic device, the first electronic device and the second electronic device have the same calculated similarity, so that provision of recommended information by the first electronic device and the second electronic device and the recommended information of the first electronic device and the second electronic device are the same. By contrast, when the service profile received from the first electronic device is different from the service profile received from the second electronic device, the first electronic device and the second electronic device have the different similarity, so that provision of recommended information by the first electronic device and the second electronic device and the recommended information of the first electronic device and the second electronic device are different. For example, the first electronic device may provide the recommended information because the similarity is equal to or larger than the reference value, but the second electronic device may not provide the recommended information because the similarity is smaller than the reference value.

Figure 5:
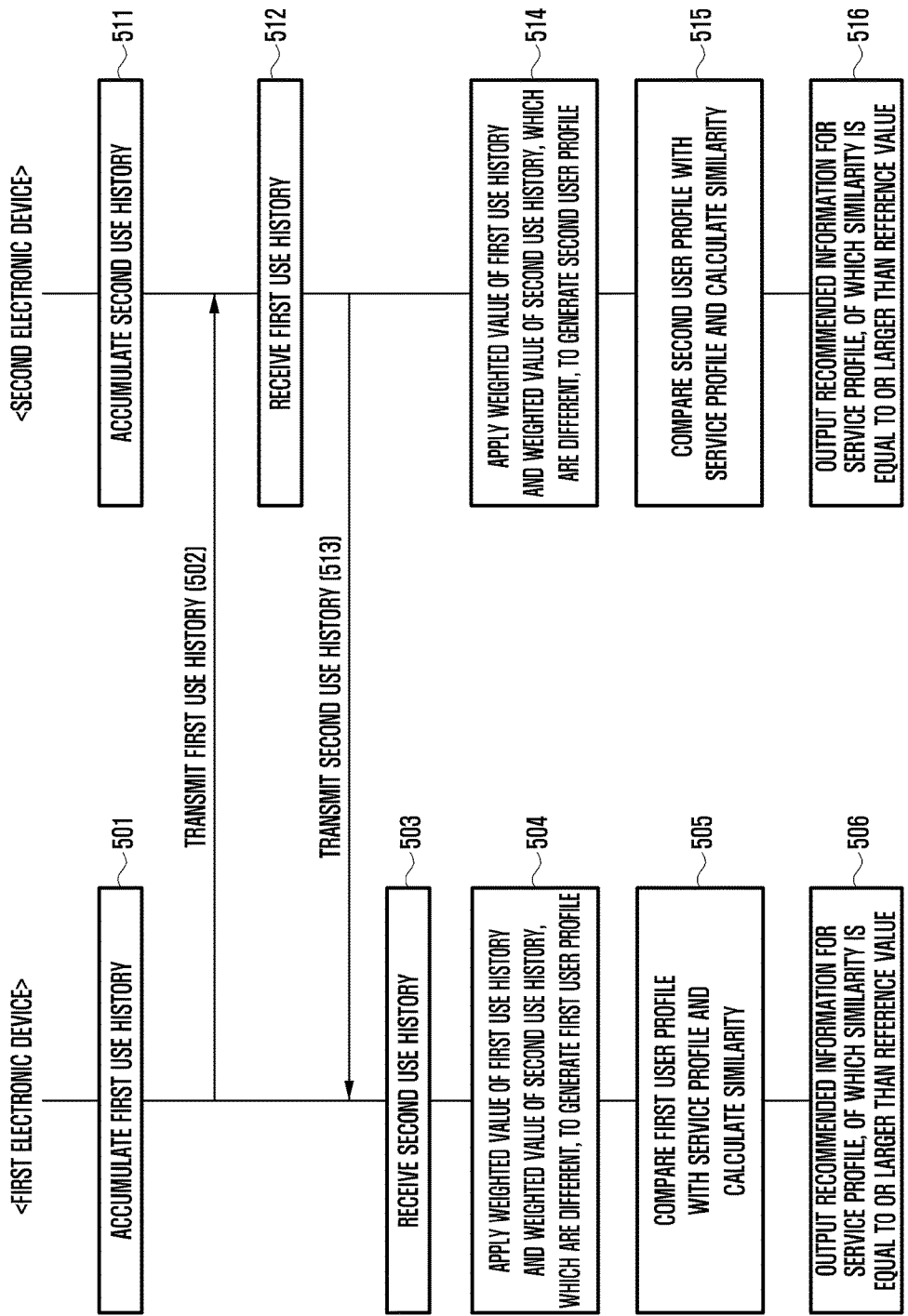

FIG. 5 is a flowchart illustrating an example embodiment in which the first electronic device and the second electronic device share a use history, and each generate a user profile.

Referring to FIG. 5, in operation 501, the first electronic device may accumulate a first use history. In operation 502, the first electronic device may transmit the first use history to the second electronic device. When the first electronic device periodically receives a request from the second electronic device, or receives a service profile from a service provider, the first electronic device may transmit the first use history to the second electronic device.

In operation 511, the second electronic device may accumulate the second use history. In operation 512, the second electronic device may receive the first use history from the first electronic device. In operation 513, the second electronic device may transmit the second use history to the first electronic device. When the second electronic device periodically receives the first use history, or receives a service profile from a service provider, the second electronic device may transmit the second use history to the first electronic device.

The first use history may be the same as or different from the second use history. The first use history and the second use history are sufficient similar to the use history described with reference to FIGS. 1 and 2, such that a detailed description thereof will be omitted for the sake of brevity.

In operation 503, the first electronic device may receive the second use history. In operation 504, the first electronic device may assign a higher weighted value to the first use history than the second use history, and generate a first user profile. The reason the higher weighted value is assigned to the first use history is to provide more specialized recommended information for the first electronic device. In operation 505, the first electronic device may compare the first user profile and the service profile and calculate a similarity. In operation 506, the first electronic device may output recommended information related to the service profile of which the similarity is equal to or larger than a reference value. According to the example embodiment of the present disclosure, the first electronic device may transmit the first user profile to the second electronic device.

Similarly, in operation 514, the second electronic device may assign a higher weighted value to the second use history than the first use history, and generate a second user profile. The reason is to provide more specialized recommended information to the second electronic device. In operation 515, the second electronic device may compare the second user profile and the service profile and calculate similarity. In operation 516, the second electronic device may output recommended information related to the service profile of which the similarity is equal to or larger than the reference value.

That is, the first user profile may be different from the second user profile. For example, even though the service profile received from the first electronic device is the same as the service profile received from the second electronic device, the user profile generated by the first electronic device is different from the user profile generated by the second electronic device, so that provision of recommended information by the first electronic device and the second electronic device and the recommended information of the first electronic device and the second electronic device are different. By contrast, when the service profile received from the first electronic device is different from the service profile received from the second electronic device, the first electronic device and the second electronic device have different similarities, so that provision of recommended information by the first electronic device and the second electronic device and the recommended information of the first electronic device and the second electronic device are different.

Figure 6:
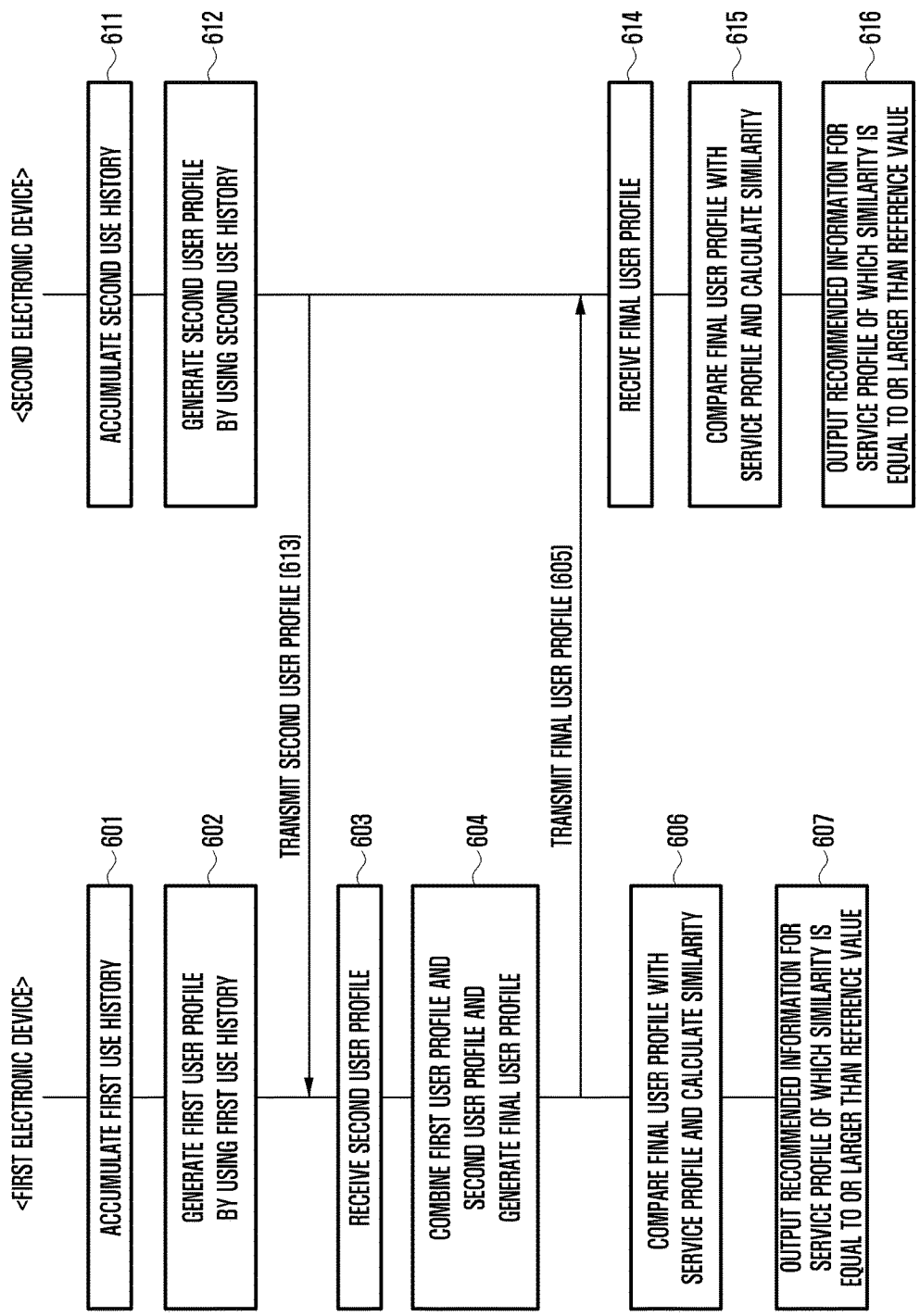

FIG. 6 is a flowchart illustrating an example embodiment in which the first electronic device generates a final user profile by using a second user profile received from the second electronic device, and shares the generated final user profile with the second electronic device.

Referring to FIG. 6, in operation 601, the first electronic device may accumulate a first use history. In operation 602, the first electronic device may generate a first user profile by using the first use history.

In operation 611, the second electronic device may accumulate the second use history. In operation 612, the second electronic device may generate a second user profile by using the second use history.

The first use history and the second use history are sufficiently similar as the use history described with reference to FIGS. 1 and 2, so that a detailed description thereof will be omitted for the sake of brevity.

In operation 613, the second electronic device may transmit the second user profile to the first electronic device. The first user profile may be different from the second user profile. When the second electronic device periodically receives a request from the first electronic device, or receives a service profile from a service provider, the second electronic device may transmit the second user profile to the first electronic device.

In operation 603, the first electronic device may receive the second user profile from the second electronic device. In operation 604, the first electronic device may combine the first user profile and the second user profile and generate a final user profile. In this case, the first electronic device may assign the same weighted value to the first user profile and the second user profile to generate the final user profile. When the first electronic device periodically receives the second user profile from the second electronic device or the service profile from the service provider, the first electronic device may generate the final user profile. As the example embodiment, the first electronic device may generate the user profile having the type corresponding to the service profile. For example, when the service profile is related to a category of type designated as "application," the electronic device may generate a user profile for the application.

In operation 605, the first electronic device may transmit the generated final user profile to the second electronic device. In operation 606, the first electronic device may compare the final user profile and the service profile and calculate a similarity. In operation 607, the first electronic device may output recommended information related to the service profile for which the similarity is equal to or larger than a reference value.

Similarly, in operation 614, the second electronic device may receive the final user profile to the first electronic device. In operation 615, the second electronic device may compare the final user profile and the service profile and calculate a similarity. In operation 616, the second electronic device may output recommended information related to the service profile for which the similarity is equal to or larger than the reference value.

For reference, when the service profile received from the first electronic device is the same as the service profile received from the second electronic device, the first electronic device and the second electronic device have the same calculated similarity, so that provision of recommended information by the first electronic device and the second electronic device and the recommended information of the first electronic device and the second electronic device are the same. By contrast, when the service profile received from the first electronic device is different from the service profile received from the second electronic device, the first electronic device and the second electronic device have different similarities, so that provision of recommended information by the first electronic device and the second electronic device and the recommended information of the first electronic device and the second electronic device may be different.

Figure 7:
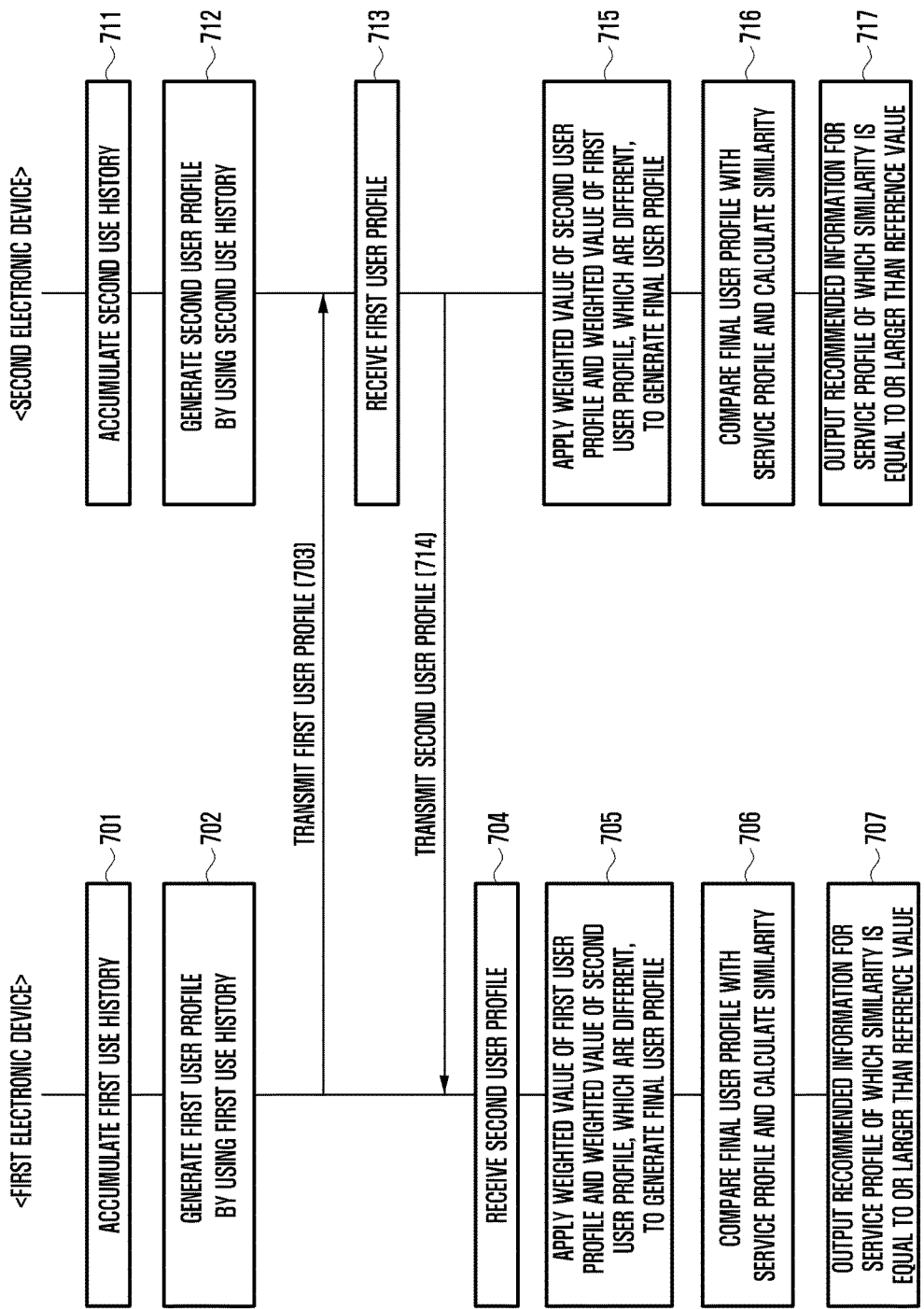

FIG. 7 is a flowchart illustrating an example embodiment in which the first electronic device and the second electronic device share a user profile, and generate a final user profile each.

Referring to FIG. 7, in operation 701, the first electronic device may accumulate a first use history. In operation 702, the first electronic device may generate a first user profile by using the first use history. In operation 703, the first electronic device may transmit the first user profile to the second electronic device. When the first electronic device periodically receives a request from the second electronic device, or receives a service profile from a service provider, the second electronic device may transmit the first user profile to the second electronic device.

In operation 711, the second electronic device may accumulate a second use history. In operation 712, the second electronic device may generate a second user profile by using the second use history. In operation 713, the second electronic device may receive the first user profile from the first electronic device. In operation 714, the second electronic device may transmit the second user profile to the first electronic device. When the second electronic device periodically receives the first user profile, or receives a service profile from a service provider, the second electronic device may transmit the second user profile to the first electronic device.

In operation 704, the first electronic device may receive the second user profile. In operation 705, the first electronic device may assign a higher weighted value to the first user profile than the second user profile, and generate a final user profile. The reason for assigning a higher weighted value to the first user profile may be to provide more specialized recommended information to the first electronic device. In operation 706, the first electronic device may compare the final user profile and the service profile and calculate a similarity. In operation 707, the first electronic device may output recommended information related to the service profile for which the similarity is equal to or larger than a reference value. According to the example embodiment of the present disclosure, the first electronic device may transmit the final user profile to the second electronic device.

In operation 715, the second electronic device may assign a higher weighted value to the second user profile than the first user profile, and generate a final user profile (different than the final user profile generated in operation 705). The reason of assigning a higher weighted value to the second user profile is to provide more specialized recommended information to the second electronic device. In operation 716, the second electronic device may compare the final user profile and the service profile and calculate a similarity. In operation 717, the second electronic device may output recommended information related to the service profile for which the similarity is equal to or larger than the reference value.

That is, the final user profile of the first electronic device may be different from the final user profile of the second electronic device. For example, even though the service profile received from the first electronic device is the same as the service profile received from the second electronic device, the final user profile generated by the first electronic device is different from the final user profile generated by the second electronic device, so that provision of recommended information and the recommended information of the first electronic device and the second electronic device may be different. By contrast, when the service profile received from the first electronic device is different from the service profile received from the second electronic device, the first electronic device and the second electronic device have different similarities, so that provision of recommended information by the first electronic device and the second electronic device and the recommended information of the first electronic device and the second electronic device are different.

The embodiments disclosed in the present specifications and drawings were provided merely to readily describe and to help a thorough understanding of the present disclosure but not intended to limit the present disclosure. Therefore, it should be construed that, in addition to the embodiments disclosed herein, all modifications and changes or modified and changed forms derived from the technical idea of the present disclosure fall within the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device providing a personalized service, comprising:
    a display;
    a communication unit, comprising a communication circuitry, configured to receive a service profile from a service provider;
    a memory configured to store instructions; and
    at least one processor configured to connect electrically with the display, the communication unit, and the memory;
    wherein the memory, while being executed, stores the instructions for the at least one processor to:
        control the communication unit to receive, via a short range wireless communication, an external use history from at least one external electronic device during a preset period;
        encrypt the external use history and store the encrypted use history in the memory;
        assign a higher weighted value to a use history of the electronic device relative to the external use history;
        combine the use history and the external use history according to the assigned weighted value;
        generate a user profile based on the combined the use history and the external use history;
        compare the service profile and the generated user profile to detect a similarity; and
        control the display to display recommended information related to the service profile for which the detected similarity is equal to or greater than a reference value,
    wherein the at least one external electronic device is preset as a target to receive the personalized service.

2. The electronic device of claim 1, wherein the memory stores instructions for the at least one processor to receive an input setting the electronic device as a target to receive the personalized service.

3. The electronic device of claim 1, wherein the memory stores instructions for the at least one processor to:
    update the use history, the use history further including at least one of a product purchase history, an Internet access history, an application use history, and a data use history by the electronic device.

4. The electronic device of claim 1, wherein the memory stores instructions for the at least one processor to control the communication unit to transmit the generated user profile to the at least one external electronic device set as a target to receive the personalized service.

5. The electronic device of claim 1, wherein the memory stores instructions for the at least one processor to control the communication unit to receive an external user profile from the at least one external electronic device set as a target to receive the personalized service, and combine the user profile and the received external user profile to generate a final user profile.

6. The electronic device of claim 5, wherein the memory stores instructions for the at least one processor to assign a higher weighted value to the user profile than the external user profile, and combine the user profile and the external user profile according to the assigned weighted value to generate the final user profile.

7. A method providing a personalized service in an electronic device, comprising:
- receiving, via a short range wireless communication, an external use history from at least one external electronic device during a preset period;
- encrypting the external use history and storing the encrypted use history in the memory;
- assigning a higher weighted value to a use history of the electronic device relative to the external use history;
- combining the use history and the external use history according to the assigned weighted value;
- generating a user profile based on the combined the use history and the external use history;
- receiving a service profile from a service provider and comparing the user profile and the service profile to detect a similarity; and
- displaying recommended information related to the service profile for which the detected similarity is equal to or greater than a reference value,
- wherein the at least one external electronic device is preset as a target to receive the personalized service.

8. The method of claim 7, further comprising:
receiving an input setting the electronic device as a target to receive the personalized service.

9. The method of claim 7, further comprising:
update the use history, the use history including at least one of a product purchase history, an Internet access history, an application use history.

10. The method of claim 7, wherein generating the user profile further comprises:
- detecting an input setting a weighted value of the use history to be higher than a weighted value of the external use history; and
- combining the use history and the external use history according to the set weighted value to generate the user profile.

11. The method of claim 7, further comprising:
transmitting the generated user profile to the at least one external electronic device set as a target to receive the personalized service.

12. The method of claim 7, wherein generating the user profile further comprises:
- receiving an external user profile generated by the at least one external electronic device set as a target to receive the personalized service; and
- combining the user profile and the external user profile to generate a final user profile.

13. The method of claim 12, wherein generating the user profile further comprises:
- detecting an input setting a weighted value of the user profile to be higher than a weighted value of the external user profile; and
- combining the user profile and the external user profile according to the set weighted value to generate the final user profile.

* * * * *